United States Patent
Edwards et al.

(10) Patent No.: US 9,541,672 B2
(45) Date of Patent: Jan. 10, 2017

(54) ESTIMATING CHANGE IN POSITION OF PRODUCTION TUBING IN A WELL

(71) Applicant: BAKER HUGHES INCORPORATED, Houston, TX (US)

(72) Inventors: Carl M. Edwards, Katy, TX (US);
Daniel T. Georgi, Houston, TX (US);
Antonius M. Loermans, Dhahran (SA)

(73) Assignee: BAKER HUGHES INCORPORATED, Houston, TX (US)

( * ) Notice: Subject to any disclaimer, the term of this patent is extended or adjusted under 35 U.S.C. 154(b) by 846 days.

(21) Appl. No.: 13/720,521

(22) Filed: Dec. 19, 2012

(65) Prior Publication Data
US 2014/0165720 A1 Jun. 19, 2014

(51) Int. Cl.
| | | |
|---|---|---|
| G01V 1/40 | (2006.01) | |
| G01V 3/18 | (2006.01) | |
| G01V 5/04 | (2006.01) | |
| G01V 9/00 | (2006.01) | |
| G01V 7/00 | (2006.01) | |

(52) U.S. Cl.
CPC ........................................ G01V 7/00 (2013.01)

(58) Field of Classification Search
CPC .............. G01V 7/00; G01V 1/30; G01V 1/48; G01V 1/50; E21B 43/00; E21B 49/00
USPC .................................................... 702/11, 12
See application file for complete search history.

(56) References Cited

U.S. PATENT DOCUMENTS

| | | | |
|---|---|---|---|
| 4,457,168 A | 7/1984 | Lautzenhiser et al. | |
| 4,517,836 A | 5/1985 | Lyle, Jr. et al. | |
| 5,606,124 A | 2/1997 | Doyle et al. | |
| 5,821,413 A | 10/1998 | Chapin | |
| 6,006,832 A | 12/1999 | Tubel et al. | |
| 6,769,499 B2 | 8/2004 | Cargill et al. | |
| 7,069,780 B2 | 7/2006 | Ander | |
| 8,113,042 B2 | 2/2012 | Donadille et al. | |
| 8,135,541 B2 | 3/2012 | Davis et al. | |
| 8,136,591 B2 | 3/2012 | Del Campo et al. | |
| 2008/0015803 A1* | 1/2008 | Niebauer ............... | G01V 13/00 702/85 |
| 2009/0044618 A1* | 2/2009 | DiFoggio ................. | G01V 7/00 73/152.59 |
| 2009/0084534 A1 | 4/2009 | Zupanick | |
| 2010/0145620 A1 | 6/2010 | Georgi et al. | |
| 2010/0161226 A1 | 6/2010 | Homan | |
| 2011/0158050 A1 | 6/2011 | Merino et al. | |
| 2011/0191027 A1 | 8/2011 | Pfutzner et al. | |

(Continued)

Primary Examiner — Michael Nghiem
(74) Attorney, Agent, or Firm — Mossman Kumar & Tyler PC (57) ABSTRACT

Characterizing a parameter of interest relating to a formation intersected by a borehole. Methods may include estimating the parameter using at least one gravity measurement adjusted to account for a gravity field gradient associated with a change in a frame of reference caused by removal of a reference feature from the borehole. Methods may also include taking at least one prior gravity measurement before removal of the reference feature from the borehole; taking at least one prior gravity measurement after removal of the reference feature from the borehole; estimating the change in the frame of reference based on the prior gravity measurements taken before and after removal of the reference feature; and adjusting the at least one gravity measurement using the estimated change.

10 Claims, 5 Drawing Sheets

(56) References Cited

U.S. PATENT DOCUMENTS

| | | |
|---|---|---|
| 2013/0191030 A1 | 7/2013 | Edwards et al. |
| 2013/0206397 A1* | 8/2013 | Georgi .................. E21B 47/09 |
| | | 166/250.01 |
| 2014/0083186 A1* | 3/2014 | Levitt ..................... G01V 7/00 |
| | | 73/382 R |
| 2014/0224012 A1* | 8/2014 | Klopping ................ G01V 7/14 |
| | | 73/382 G |

* cited by examiner

ESTIMATING CHANGE IN POSITION OF PRODUCTION TUBING IN A WELL

BACKGROUND OF THE DISCLOSURE

1. Field of the Disclosure

In one aspect, this disclosure generally relates to methods and apparatuses for characterizing a parameter of interest of an earth formation using gravitational measurements. In another aspect this disclosure generally relates to methods and apparatuses for estimating differences in frames of reference for gravitational measurements.

2. Background of the Art

In many fields of endeavor, it may be useful to characterize a parameter relating to an earth formation, such as parameters relating to one or more fluids of the earth formation. For example, in exploration, development, and monitoring related to hydrocarbon production, it is important to make accurate measurements of geologic formations. The geologic formations below the surface of the earth may contain reservoirs of oil and gas or underground bodies of water. The geologic formations may include formation layers and various structures. In a quest for oil and gas, it is important to know about the location and composition of the formation layers and the various structures. In particular, it is important to know about the geologic formations with a high degree of accuracy so that resources are not wasted. The present disclosure addresses the need to obtain information relating to geologic formations over the life of a reservoir.

One way of characterizing an earth formation is by using gravity measurements to estimate hydrocarbon or other fluid movement. Time-lapse reservoir monitoring is an important application for borehole gravimeters. Hydrocarbons in earth formations, such as reservoirs, are subject to the migration of fluids (oil, water, gas, etc.) over time. Detecting, measuring, and mapping the movement of these fluids may be useful for estimating the producible hydrocarbon content of an earth formation and improving hydrocarbon recovery. The hydrocarbon movement may also be used to estimate the rate of depletion of a reservoir.

SUMMARY OF THE DISCLOSURE

In one aspect, this disclosure generally relates to methods and apparatuses for characterizing a parameter of interest of an earth formation, or formation parameter, using gravitational measurements. The parameter of interest may be a parameter relating to at least one fluid in an earth formation intersected by the borehole, or fluid parameter. Example fluids may include oil, natural gas, water, carbon dioxide, and so on.

In another aspect, this disclosure generally relates to methods and apparatuses for quantification of a difference of position between a previous frame of reference and a new frame of reference for gravitational measurements. The frame of reference may refer to a coordinate system for use with gravitational measurements. Gravitational measurements with respect to a frame of reference may be carried out with reference to a static physical feature associated with the borehole ('reference feature'), such as, for example, features of the formation, casing, or production tubing. The reference frames may be semi-permanent, such that they are used for gravitational measurements over a long period. These reference frames may be used continually until a specific event necessitates a shift from the previous reference frame to the new reference frame. One such event may be the loss or movement of a reference feature.

In another aspect, this disclosure generally relates to methods and apparatuses for linking a previous frame of reference in a borehole to a new frame of reference by using gravity measurements before an event causing a shift from the previous frame of reference to the new frame of reference and after the event. The event may be, for example, removal of a physical reference feature associated with the previous frame of reference. A time window spanning the measurements before and after the event may be sufficiently short such that a gravity field encapsulating the respective measurement locations remains substantially unchanged over the time window.

In another aspect, this disclosure generally relates to methods and apparatuses for characterizing a parameter of interest relating to a formation intersected by a borehole. The parameter of interest may be a parameter relating to at least one fluid in an earth formation intersected by the borehole, or fluid parameter. Methods may include a step of estimating the parameter using at least one gravity measurement adjusted to account for a gravity field gradient associated with a change in a frame of reference caused by removal of a reference feature from the borehole. Methods may also include taking at least one prior gravity measurement before removal of the reference feature from the borehole; taking at least one prior gravity measurement after removal of the reference feature from the borehole; estimating the change in the frame of reference based on the prior gravity measurements taken before and after removal of the reference feature; and adjusting the at least one gravity measurement using the estimated change.

The change in the frame of reference may be at least one of i) a coordinate translation caused by a change in reference feature position; and ii) a coordinate rotation caused by a change in gravity sensor orientation. The reference feature may be positioned in the borehole and along the production tubing. The reference feature may be incorporated in or integral to the production tubing, such as human made features applied to production tubing using adhesives or fasteners (e.g., glued or clamped) or inserted into the production tubing (e.g., inserts, plugs or bullets), or deformations of the production tubing (e.g., depressions or holes).

General embodiments may include methods to estimate changes in reference feature location of production tubing (to within the required accuracy) over a time period during which production tubing is removed, and use features in the production tubing to serve as reference points to reposition gravimeters to the needed precision even after a well has been worked over.

In another aspect, this disclosure generally relates to methods and apparatuses characterizing a parameter relating to a formation intersected by a borehole. Methods may include estimating the parameter using gravity measurements in the borehole by accounting for a change in a frame of reference occurring in a time period between at least two of the gravity measurements caused by removal of a reference feature from the borehole.

In another aspect, this disclosure generally relates to methods and apparatuses characterizing a parameter relating to a formation intersected by a borehole. Methods may include linking a frame of reference for a borehole gravity measurement associated with a first reference feature in the borehole to another frame of reference for another borehole gravity measurement associated with a second reference feature in the borehole. Linking frames of reference may be carried out by using at least one linking gravity measurement occurring prior to an event necessitating use of the second reference feature and at least one other linking gravity measurement occurring after the event. The linking gravity measurements may occur in a time window of a duration such that a gravity field spanning the respective locations of the linked gravity measurements remains substantially unchanged over the time window.

In another aspect, this disclosure generally relates to methods and apparatuses characterizing a parameter relating to a formation intersected by a borehole. Methods may include estimating the parameter using at least one first gravity measurement associated with a first frame of reference before removal of a reference feature of the first frame of reference from the borehole and at least one second gravity measurement associated with a second frame of reference from the borehole after removal of the reference feature of the first frame of reference from the borehole, the at least one first gravity measurement and the at least one second gravity measurement reconciled by linking the first frame of reference with the second frame of reference using at least one third gravity measurement associated with the first frame of reference before removal of the reference feature and at least one fourth gravity measurement associated with the second frame of reference after removal of the reference feature.

In another aspect, this disclosure generally relates to methods and apparatuses characterizing a parameter relating to a formation intersected by a borehole. Methods may include removing a first gravimeter and a first reference feature from a borehole; positioning a second reference feature and a second gravimeter in the borehole; estimating a difference in position between the first reference feature and the second reference feature; and adjusting at least one gravimeter measurement using the estimated difference. The parameter may relate to at least one of: (i) a fluid contact, (ii) water migration, (iii) liquid hydrocarbon migration, (iv) gaseous hydrocarbon migration, (v) gas migration, (vi) fluid saturation, etc. Methods may further include taking a first gravity measurement using the first gravimeter before removing the first gravimeter from the borehole; and taking a second gravity measurement using the second gravimeter; wherein the difference in position between the first reference feature and the second reference feature is estimated using the first gravity measurement and the second gravity measurement.

In another aspect, this disclosure generally relates to apparatus for characterizing a parameter relating to a formation intersected by a borehole. The apparatus may comprise at least one gravimeter configured for conveyance in the borehole; and at least one processor configured to estimate the parameter using at least one gravity measurement from the gravimeter adjusted to account for a gravity field gradient associated with a change in a frame of reference caused by removal of a reference feature from the borehole. The processor may be further configured to estimate the change in the frame of reference based on at least one prior gravity measurement from the gravimeter taken before removal of the reference feature from the borehole and at least one prior gravity measurement taken from the gravimeter after removal of the reference feature from the borehole; and adjust the at least one gravity measurement using the estimated change. The change in the frame of reference may be at least one of i) a coordinate translation caused by a change in reference feature position; and ii) a coordinate rotation caused by a change in gravity sensor orientation.

The difference in position between the first reference feature and the second reference feature may be estimated using an estimated gravitational field gradient at at least one of the first gravity measurement and the second gravity measurement. The estimated gravitational field gradient may be obtained using i) a plurality of measurements of the first gravimeter; ii) a plurality of measurements of the second gravimeter, iii) a gradiometer, iv) at least one measurement from each of the first gravimeter and the second gravimeter; v) at least one measurement from each of the first gravimeter and a third gravimeter mounted on a tool with the first gravimeter; and vi) at least one measurement from each of the second gravimeter and a fourth gravimeter mounted on a tool with the second gravimeter.

At least one of the first reference feature and the second reference feature may be positioned in the borehole and along the production tubing. The second reference feature may be the same as the first reference feature or different from the first reference feature. The second gravimeter may be the same as the first gravimeter or different from the first gravimeter. Some method embodiments include lowering the first gravimeter into the borehole.

Further method embodiments include the steps of estimating a difference in orientation between the first gravimeter and the second gravimeter. Adjusting the at least one gravimeter measurement may comprise adjusting the at least one gravimeter measurement using the estimated difference in orientation.

Another embodiment according to the present disclosure includes a non-transitory computer-readable medium product having instructions thereon that, when read by at least one processor, causes the at least one processor to execute a method disclosed herein. For example, the computer-readable medium product may cause the at least one processor to execute a method comprising estimating at least one fluid parameter using at least one gravity measurement adjusted to account for a gravity field gradient associated with a change in a frame of reference caused by removal of a reference feature from the borehole.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

The present disclosure relates to devices and methods for characterizing a parameter of interest of an earth formation using gravitational measurements over time, including gravitational measurements in a borehole. These measurements may be taken periodically to detect changes in gravitational acceleration over time at a specific location. The parameter of interest may be a parameter relating to at least one fluid in an earth formation intersected by the borehole, or fluid parameter. The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Measuring properties of geologic formations provides information that can be useful for locating reservoirs of oil and gas. Generally, the oil and gas are retrieved by drilling boreholes into the subsurface of the earth. The boreholes also provide access for taking measurements of the geologic formations. Similar techniques may be applied to investigating water in an earth formation (e.g., an aquifer, a geothermal incidence, a water front, etc.) for managing a water resource (or for managing the borehole or other subterranean infrastructure, such as, for example, a mine or tunnel), for determining carbon dioxide sequestration, for monitoring changes in gas storage, or for other applications as would occur to those of skill in the art.

In time-lapse reservoir monitoring, one or more gravimeters measure gravitational acceleration at locations in the wellbore (and/or at the surface) periodically over the life of the reservoir. The measurements are used to detect changes in gravitational acceleration at the locations over time. The differences in these measurements may then be used to estimate changes in fluid saturations. One specific application uses these measurement changes to estimate the location of a water/oil interface during water floods and then optimizes the water flood using this information.

For some time-dependent gravimetric applications, such as time-lapse reservoir monitoring, very precise positioning (or repositioning) of a gravimeter is desirable. For example, in time-lapse reservoir monitoring, changes in gravity over the lifetime of the reservoir may be as large as several hundred nano-g (μGal), but differences over a shorter time period may be much smaller. These differences are typically measured in the presence of the strong background acceleration of the earth.

The earth's gravitational field is a function of location. In gravimetry, two commonly used gravimetric dependencies are classified as the free-air gradient, F, and the Bouguer gradient, B. The gradient may be described by the equation $$\frac{d}{dr}g(r) = -\frac{2Gm_e}{r_e^3} + (4\pi G)\rho(r) = F + B, \quad (1)$$

where g is the acceleration of gravity, $m_e$ is the mass of the earth, G is the gravitational constant, $r_e$ is the radius of the earth, and ρ is the earth density of the layered earth (Nettleton, 1976; Torge, 1989; Edwards, 2012). F is around 300 μGal per meter. F and B combine to produce a gradient in the vertical component of gravity that can be as large as several hundred nano-g per meter. Thus, even very small differences in the location of subsequent time-lapse measurements can then produce an effect that appears as noise on the time-dependent measurements and, for some of the most challenging applications, could overwhelm the time-dependent measurements. The target precision of repositioning may result in a noise term that is at least somewhat smaller than the precision of the gravity measurement and preferably much smaller. The target for the precision of repositioning may be a difference in depth of less than 1 cm. This results in an added noise term of 1 nano-g. The target precision may also be less than 5 centimeters, 0.5 centimeters, 0.1 centimeters, and so on.

Therefore, precise gravimeter positioning is desired. However, the actual selected positions of gravimeter(s) may not be critical when the position of measurement remains substantially fixed over the duration of the monitoring of the reservoir, or when differences in position are known and accounted for, such that measurements under unchanged conditions are repeatable.

An accurate measurement and accurate repositioning of the gravimeter each time a measurement is taken is therefore beneficial. For surface measurements, GPS, standard survey methods, and permanent instrument pads may be used to reposition gravimeters to this precision, but in the borehole, wireline-typical depth measurements (inertial navigation systems) are insufficient.

Improving Precision

One approach to improving precision of the measurements is to use reference features in the production tubing to relocate the gravimeter. Reference features in production tubing may be favorable for use in circumstances where production tubing is available, such as in production wells (which are often prime candidates for time-lapse reservoir monitoring). These reference features may be features historically associated with production tubing or reference features specially configured for the purpose of positioning a tool, such as, for example, a well tool, a gravimeter, and so on. The position of the reference feature with respect to the detector used may be ascertainable to within the target precision as described above.

Problematically, production tubing is occasionally removed during a workover of a well or for other maintenance, and for that reason will not remain fixed relative to the formation. Afterwards, replacement tubing having replacement features will be positioned in the well according to procedures known in the art. These operations have accuracy typical of wireline procedures such that the replacement feature is within a tool length of the original location. However, the accuracy of this placement is not sufficient for gravitational measurements of the kind described herein. Thus, a change in reference feature location occurs. The change in position of the reference feature described above may result in a corresponding change in frame of reference for measurements taken in relation to the reference feature. For purposes of illustration, examples of differences in reference feature positions and changes in frame of reference are used interchangeably. This change must be accounted for when reconciling data (e.g., gravitational measurements) obtained before a reference feature is removed with data obtained after the reference feature is removed.

Aspects of the present disclosure may be used to account for the position of a gravimeter in a well over a period of years with precision sufficient for time-dependent gravimetric applications such as time-lapse reservoir monitoring, even when significant parts of the otherwise permanent completion (e.g., production tubing) have been changed out over the period. Formation characterization according to the present disclosure may include accounting for the change in reference feature location. This may include estimating the change in location (e.g., measured depth) of reference features in production tubing caused by removing and replacing the tubing, such as during a workover or other maintenance.

Since the gravity field between the two gravity surveys has not changed, the exact position of the feature after the production tubing change out (in relation to the position of the feature before the change out) can be determined directly with the necessary precision to allow continued gravity time-lapse monitoring. The results of these measurements after properly taking into account sensor drift and other well-known time-dependent changes in gravitational acceleration such as the earth tides is a set of data $$\{g_n, \gamma_n, d_n\}, \{g_n', \gamma_n', d_n'\}, \quad (2)$$

where $g_n$ is the acceleration of gravity (length of the gravity vectory $g_n$) near a given feature before the workover; $d_n$ is the distance of the measurement point from the feature; and $\gamma_n = \Delta g_n / \Delta z$ is the gravity field gradient along the borehole at the measurement point. It is measured by the difference of by two spaced (by $\Delta z$) apart gravity measurements using the same or different gravity sensors. The primed variables represent the measurements made after the workover. In addition, n can take on any number from 1 to N, where N is the total number of features of the production tubing near which gravity measurements have been made.

Figure 2:
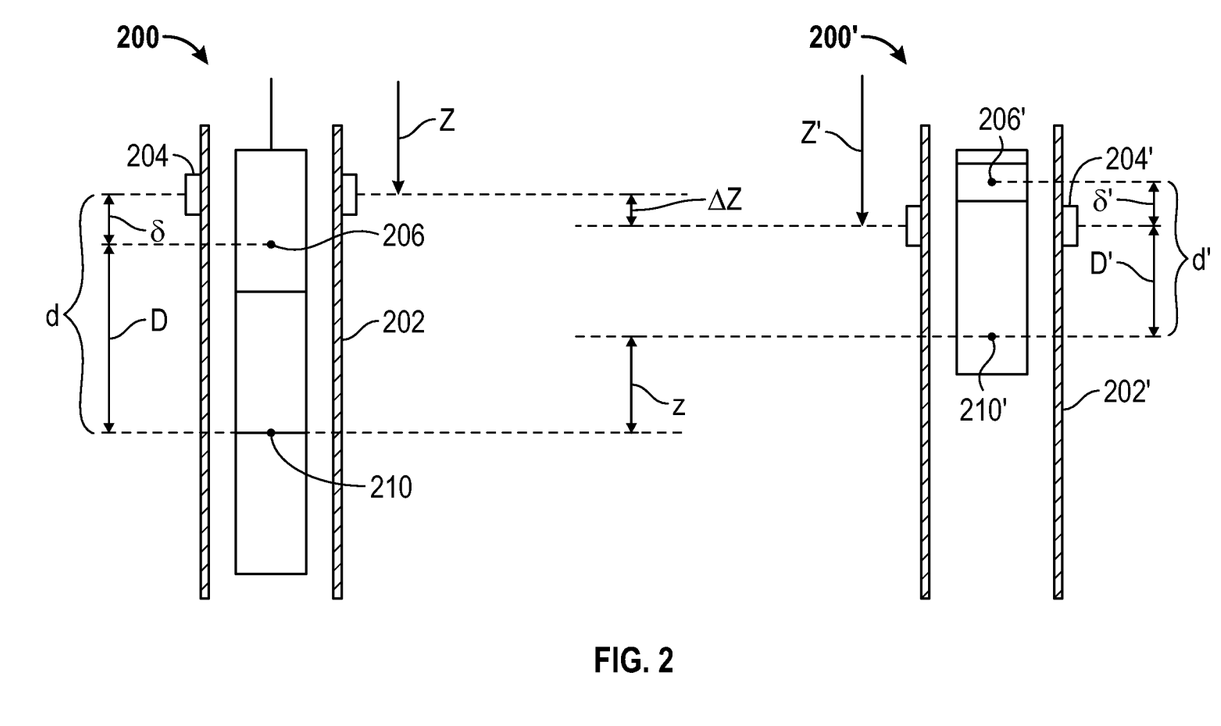
FIG. 2 shows a cross-section of an earth formation at a first time and a second time.

For the purpose of simplifying the example with reference to FIG. 2, a single reference feature is illustrated (N=1), thereby allowing the suspension, in that example, of n as a subscript. However, this process can be used at any number of features in the production string.

Figure 1:
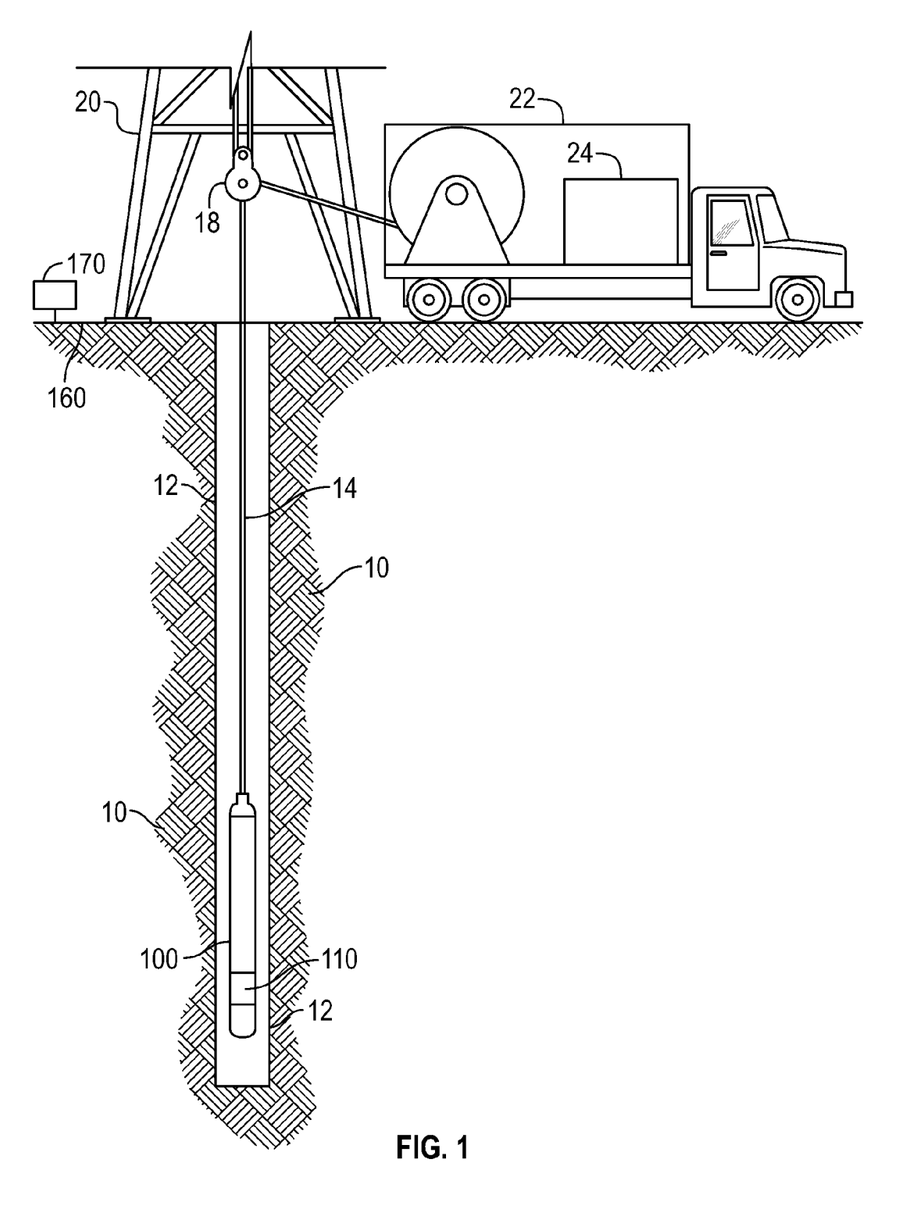
FIG. 1 shows a logging tool with a gravimeter deployed along a carrier according to one embodiment of the present disclosure.

FIG. 1 shows one embodiment according to the present disclosure wherein a cross-section of a subterranean formation 10 of an earth formation in which is drilled a borehole 12 is schematically represented. Suspended within the borehole 12 at the bottom end of a carrier such as a wireline 14 is a device, such as well tool 100. The wireline 14 may be carried over a pulley 18 supported by a derrick 20. Wireline deployment and retrieval may be performed by a powered winch carried by a service truck 22, for example. A control panel 24 interconnected to the well tool 100 through the wireline 14 by conventional means controls transmission of electrical power and data/command signals, and also provides control over operation of the components in the well tool 100.

In embodiments, the tool 100 may be configured to collect information regarding force or acceleration. An illustrative well tool 100 may include a gravimeter 110. Gravimeter 110 may be a single-component gravimeter or a multi-component gravimeter. Well tool 100 may be specially configured to take gravimetric measurements and/or to carry gravimeter 110. The gravimeter 110 may include one or more of: (i) a relative gravimeter and (ii) an absolute gravimeter. The gravimeter may include (i) a single axis gravimeter or (ii) a vector gravimeter. The gravimeter 110 may include an interferometric gravimeter. A non-limiting example of an interferometric gravimeter may include a proof-mass on a spring comprising at least one side of at least one Fabry-Perot etalon. A suitable light source may impinge on the etalon and interrogate the etalon's response to acceleration due to gravity. Depending on the operating principle of the well tool 100, the well tool 100 may be configured to operate under surface and borehole conditions. The ambient temperature in the borehole may exceed 120 degrees Celsius (248 degrees Fahrenheit). In other embodiments, gravimeter 110 from well tool 100, may be used at the surface 160. The borehole 12 may also intersect surface 160 at a point 170, which may be the well head.

An earth formation may be characterized in accordance with embodiments of the invention by using at least one gravimeter configured to generate gravity information by measuring the acceleration of gravity at a particular location (i.e., a gravity measurement). The at least one gravimeter 110 may be deployed at the surface of the earth formation (e.g., at point 170 or elsewhere at the surface 160) or within the earth formation in or near a volume of interest, such as, for example, in borehole 12. In some implementations, a plurality of gravimeters 110 may be used in multiple locations. The volume of interest may be a hydrocarbon reservoir. In some embodiments, the at least one gravimeter may include one or more vector gravimeters positioned in one or more boreholes penetrating an earth formation.

Well tool 100 may also be configured to deploy the gravimeter 110 within the borehole 12 to a fixed position proximate to a reference feature. For example, the reference feature may be within a tool length of the fixed gravimeter, within two meters, a meter of the gravimeter, 50 centimeters of the gravimeter, 10 centimeters, 5 centimeters, or any other distance such that the gravity gradient may be estimated sufficiently accurately. The distance from the reference feature to the gravitational sensor may be known to the precision required of the positioning of the tool during reservoir monitoring, such as, for example, within about 1 cm. Here, the gravimeter 110 may be detachable from the tool 100. The nominal position of the gravimeter 110 may be estimated using methods well known within the hydrocarbon production community. An example would be to use the depth as measured along the borehole in combination with data from a well survey. Another example would be to detect the particular reference feature at the target depth by detecting the specific feature. At the selected depth, the gravimeter 110 may be positioned against the borehole wall 12, such as by a mechanism like a hydraulic cylinder, and attached to the earth formation or borehole casing by some method known to those skilled in the art of permanent sensing. A measurement of the gravity vector may be made by the gravimeter 110 before the attachment mechanism is retracted into tool 100.

At the selected depth, the gravimeter 110 may be positioned against the borehole wall 12, such as by a mechanism like a hydraulic cylinder, and attached to the earth formation or borehole casing by some method known to those skilled in the art of permanent sensing. A measurement of the gravity vector may be made by the gravimeter 110 before the attachment mechanism is retracted into tool 100.

In some embodiments, tool 100 may include a device configured to detect and/or estimate fluid saturation (e.g., water saturation) and/or fluid flow in the subterranean formation 10. For example, the tool 100 may be configured to detect measurements used to estimate the location of water/oil interface during water flooding. Fluid saturation and other fluid movement parameters may be estimated by comparing gravitational acceleration measurements with other gravitational acceleration measurements over time.

FIG. 2 shows a cross-section 200 of a borehole 12 in an earth formation 10 at a first time before removal of a first gravimeter 210 and first reference feature 204 from the borehole 12 and a cross-section 200' of the same borehole 12 in the same earth formation 10 at a second time after first gravimeter 210 and first reference feature 204 are removed from the borehole 12, and second gravimeter 210' and second reference feature 204' are positioned in the borehole 12. Second gravimeter 210' may be the same gravimeter as first gravimeter 210 or a different gravimeter. Gravity measurements may be made in the borehole 12 at the first and second time using the device 100 of FIG. 1. Additional gravity measurements may also be made at the surface 160, such as, for example, at point 170.

Features 204, 204' may be features typically found in production tubing or features purposefully added for the purpose of repositioning. As shown in FIG. 2, the feature is a tubing collar, but any other feature that can be detected with sufficient precision may be used. Example features may include any characteristic of completion structures which may be removed for a workover or other maintenance, such as, for example, production tubing, completion hardware, and the like, including, but not limited to, dimensions or materials of production tubing, joints, collars, hangers, nipples, valves, casing shoes, packers, tags, or any other features associated with a completion structure. In aspects, these features are human made and introduced from the surface into the borehole 12. Features may also be specifically configured for positioning of gravimeter 210, 210', including locking mechanisms as disclosed in U.S. Pat. No. 9,140,085. These mechanisms mechanically lock the gravity logging tool in place. The precision of the locking mechanism may be such that the vector nature of gravity measurements may be maintained, allowing components of the gravity vector to be used in providing formation information, and thus characterizing formation parameters. Features 204, 204' may be attached to or integral with production tubing 202, 202', respectively.

Feature 204 may be removed as part of the removal of the associated production tubing 202 (for example, as part of removing first tubing 202 and replacing it with second tubing 202'), or may be removed independent of the tubing. New production tubing 202' may be the same tubing 202 or a replacement tubing string with features similar to those in the removed tubing string and with similar locations. Similarly, the second reference feature 204' may be the same as reference feature 204 or a replacement feature, which may be alike or different than feature 204.

The locations of new features may be sufficiently close to the same position as the features in the first string. Sufficiently close may mean within a tool length, or within a distance that the gravity gradient may be estimated with sufficient accuracy for purposes of the disclosure. For example, if gravity measurements are 1 meter apart, the feature may be located within 2 meters of the original position. The locations of new features may be in the same position as the features in the first string to within the precision of normal depth measurement techniques (e.g., about 1 meter per thousand meters of measured depth). In some instances, features may occur regularly within new tubing, such that when new tubing is positioned, any particular feature will fall within a predetermined distance of the first feature depth, such as for example, a tool length, 5 meters, 3 meters, 2 meters, 1 meter, 0.5 meters, and so on. These features may be inserted into production tubing 202' prior to positioning the tubing in the well.

Well tools 100, 100' include location sensors 206, 206', respectively. Each location sensor 206, 206' is used to estimate the distance, $\delta$, $\delta'$, between itself and the feature 204, 204'. In some implementations, the distance may be a target distance (e.g., substantially zero, half tool length, etc.), and the sensor may be configured to detect the condition of the sensor achieving the target distance. Example location sensors may include mechanically triggered assemblies, optical sensors, magnetic sensors, electrical sensors, resistivity sensors, RFID systems, acoustic sensors, and nuclear sensors. In some implementations, location sensors 206, 206' may include tool sensors incorporated in well tools 100, 100' and configured to collect formation information. These tool sensors may be specially adapted to detect reference features 204, 204'.

The distances from the location sensors 206, 206' to the respective gravimeter 210, 210' is known (for example, through calibration, fabrication tolerances, additional sensors, etc.) and may be fixed. The distance between gravimeter and the feature location is then given by $$d = D + \delta, \tag{3}$$

in the case of the first measurement, and $$d' = D' + \delta', \tag{4}$$

in the case of the second measurement, where D, D' is the distance between the location sensor 206, 206' and the gravimeter 210, 210', respectively. The depth of the first feature 204 and the second feature 204' are represented by Z and Z', respectively.

Near the measurement point, the gravitational acceleration is approximately $$g(z) = g + \gamma z, \tag{5}$$

where z is the vertical distance (e.g., distance along the borehole or true vertical depth) from the measure point. Equating eqn. (6,7) to the measurement after the workover, we have $$g' = g(z) = g + \gamma z, \tag{6}$$

And it becomes possible to solve for z.

$$z = (g' - g)/\gamma. \tag{7}$$

The change depth along the borehole of the feature location, $\Delta Z$, is then $$\Delta Z = Z' - Z = z - (\delta' - \delta). \tag{8}$$

The change in depth of the location feature can then be used to compensate for the presence of the strong background gradient in future time-dependent gravity measurements. This results in an offset term in the expression in the expression for time-lapse gravity measurements. It is given by $$\Delta g = \gamma \Delta Z = \gamma[((g'-g)/\gamma)(\delta'-\delta)]. \tag{9}$$

Figure 3:
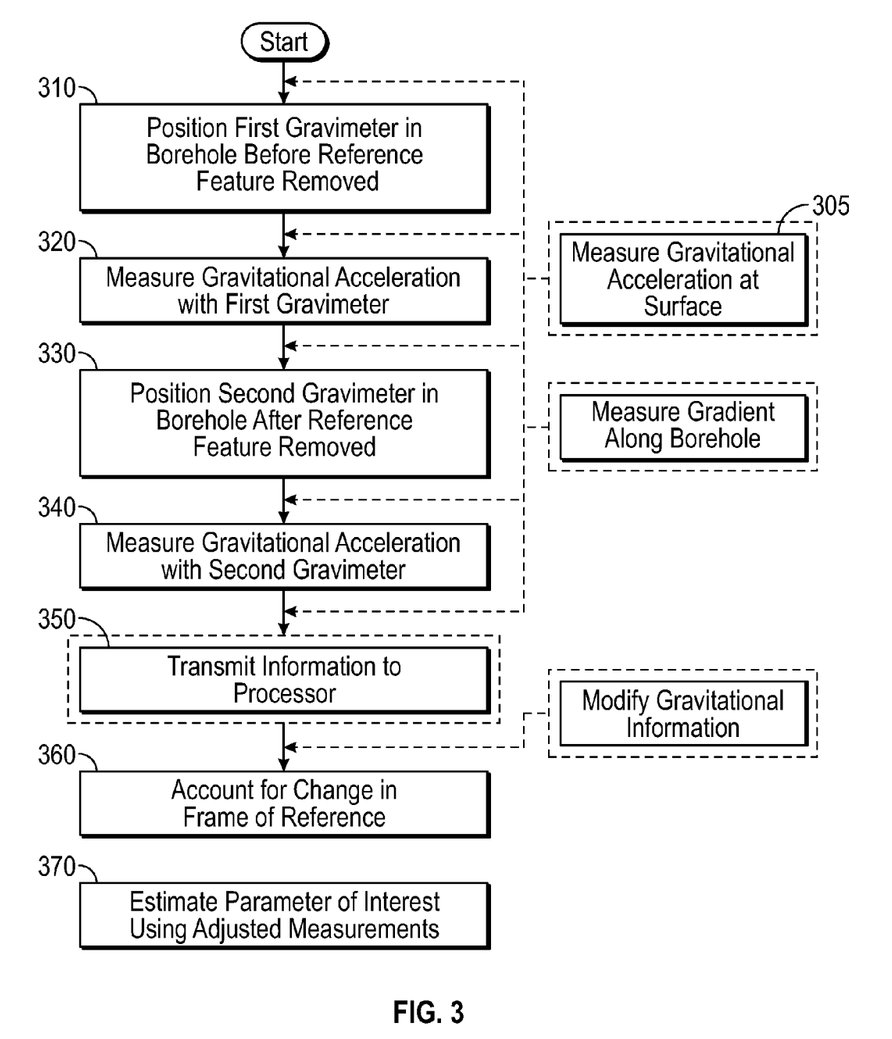
FIG. 3 shows a flow chart of one embodiment of a method for characterizing a parameter of interest relating to an earth formation intersected by a borehole according to the present disclosure.

FIG. 3 shows a flow chart of one embodiment of a method 300 for characterizing a parameter of interest relating to an earth formation intersected by a borehole according to the present disclosure. Method 300 includes step 310, where a first gravimeter 210 may be positioned in the borehole 12 at a first time before reference feature 204 is removed. The first gravimeter 210 may be positioned at or near the reference feature location and the distance between first gravimeter 210 and first reference feature 204 estimated. Step 320 includes measuring the gravitational acceleration with gravimeter 210. In step 320, position information for the first gravimeter may also be recorded. Position information may include location (relative or global position), depth, and orientation (geographical, magnetic, etc.). Next is step 330, where a second gravimeter 210' may be positioned in the borehole 12 at a second time after reference feature 204 is removed and reference feature 204' is positioned in the borehole 12. The gravimeter 210 may be positioned at or near the reference feature location and the distance between second gravimeter 210' and second reference feature 204' estimated. Step 340 includes measuring the gravitational acceleration with second gravimeter 210'. In step 340, position information for the second gravimeter may also be recorded.

In some embodiments, multiple measurements may be taken in the borehole 12 before and/or after removal of the reference feature and/or at the well head 170 or other location in order to calculate position change statistically (e.g., by averaging results), for calibration, or to allow additional calculations adapted to compensate for instrument (sensor) drift, as known in the art. In embodiments using one or more vector gravimeters, the vector gravimeters may generate signals corresponding to gravitational acceleration for each of the vector components of gravity in the earth formation 10.

Optionally, method 300 includes step 305 and/or 315. Step 305 includes measuring gravitational acceleration at the surface. If gravimeters 210, 210' are absolute or ballistic gravimeters, measurements in the borehole may be sufficient and this step may be omitted. If gravimeters 210, 210' are relative gravimeters, measurements at the surface provide a reference gravity measurement with respect to the wellhead 170, such that a gravity difference may be determined. Surface gravity measurements may be taken at the first time and/or second time, or proximate thereto (e.g., within an hour, a day, or a week, and so on), or may be taken at different times and then reconciled using methods well known in the art. Step 305 may include multiple measurements at any or all of the above times.

Step 315 includes measuring the gradient along the borehole. This may be carried out either by repositioning the tool slightly and taking an additional gravity measurement with the gravimeter at or near the first time or the second time or by using a tool with multiple gravity sensors (e.g., a gradiometer, a multiple gravimeter tool, etc.) spaced apart at suitable distances so that a gradient measurement may be taken at the same time as the first time or second time, or proximate thereto. Additional measurements with the same gravimeter may be taken at greater spacing to improve accuracy.

In optional step 350, the information may be transmitted to a processor configured to account for the change in reference feature location. Accounting for the change in reference feature location may be carried out at step 360 by estimating with the processor the change, $\Delta Z$, in location (e.g., measured depth) of reference features 204, 204'. Step 360 may also include estimating and/or accounting for, with the processor, a change in the frame of reference for gravimeter measurements from before removal of reference feature 204 and measurements after removal. For example, step 360 may be carried out by adjusting one or more measurements relating to the formation 10 such that formation information derived from measurements before reference feature removal and formation information derived from measurements after reference feature removal are reconciled.

Optionally, method 300 includes step 355 which includes modifying gravitational information (e.g., measurements, data, etc.) to compensate for known phenomena. Known phenomena may include time varying events, such as earth tides, and acute events, such as volcanism and seismic disturbances.

Step 370 uses the processor to estimate the parameter of interest using the one or more adjusted measurements. In one implementation, the processor is used to estimate the movement of fluid in the earth formation using the adjusted measurements. Movement may be measured over a period of time spanning the removal of the reference feature, such as a time interval including a workover.

In some embodiments, one or more of the steps may be optional. In some embodiments, step 350 may be omitted and fluid movement may be estimated in the borehole. In some embodiments, some or all of the steps may be repeated, or a sequence of steps may be repeated. For example, a sequence of steps 305 to 340 (inclusive) may be repeated to improve sample size without repeating steps 350, 360 and 370.

Figure 4:
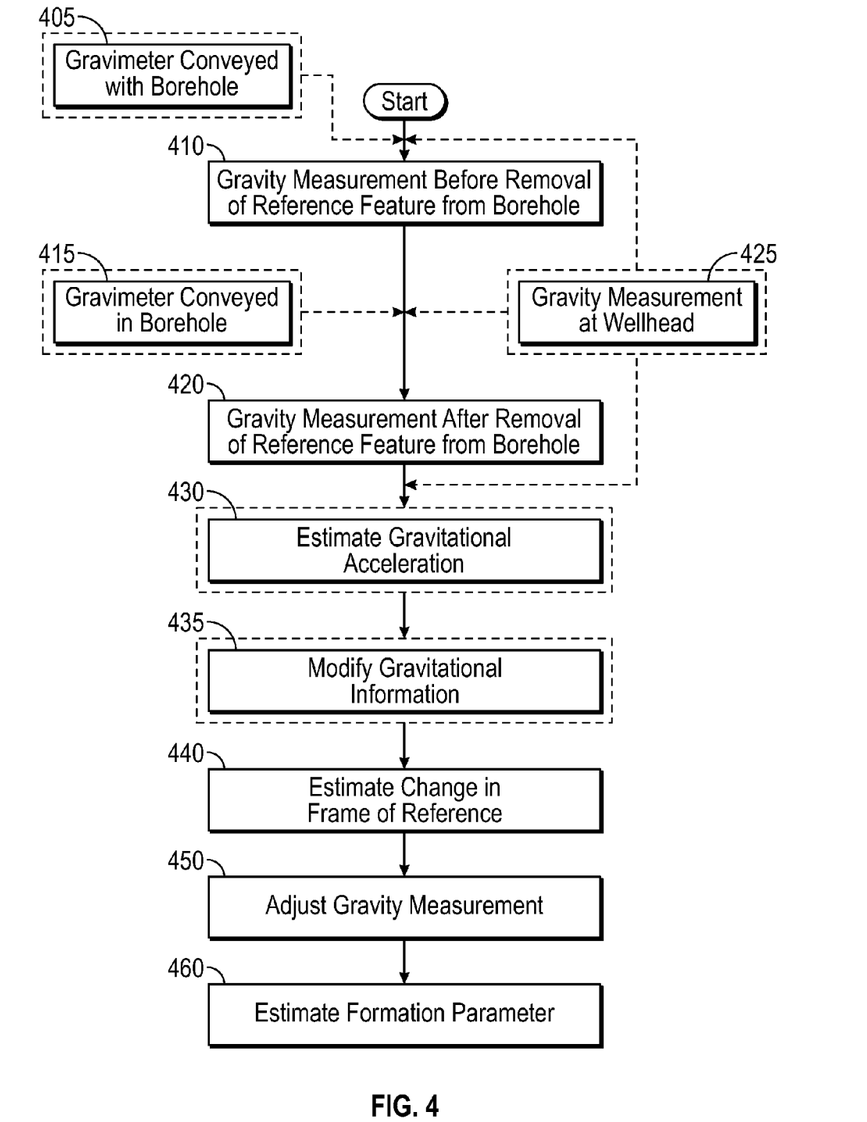
FIG. 4 shows a flow chart of another embodiment of a method for characterizing a parameter of interest relating to an earth formation intersected by a borehole according to the present disclosure.

FIG. 4 shows a flow chart of another embodiment of a method 400 for characterizing a parameter relating to an earth formation intersected by a borehole (formation parameter) according to the present disclosure. In step 410, at least one prior gravity measurement may be taken before removal of a reference feature from the borehole. In step 420, at least one prior gravity measurement may be taken after removal of the reference feature from the borehole.

In optional steps 405, 415, tool 100, 100' with gravimeter 110, 110' may be conveyed in the borehole 12. In optional step 425, at least one prior gravity measurement may be taken at the well head 170. Performance of steps 410, 420 and 425 may be modified based on the type of gravimeter used. For example, in one non-limiting embodiment using a relative gravimeter, gravity estimates may be made at several sites (e.g., depths) in the borehole 12, such as, for example, the surface of the well (well head 170). Some of these estimates may be repeated in order to estimate instrument drift of tool 100. Additionally, tool 100 may be withdrawn and replaced with tool 100' without recalibration and a similar set of measurements made. In some embodiments, multiple measurements may be taken in the borehole 12 before and/or after removal of the reference feature and/or at the well head or other location in order to calculate position change statistically (e.g., by averaging results), for more complete characterization of the formation, or to allow additional calculations adapted to compensate for instrument drift, as known in the art.

In optional step 430, gravitational acceleration may be estimated using the measurements from steps 410, 420, and/or 425. In some embodiments, the gravity estimate at the well head 170 may be performed prior to the tool 100 being conveyed in step 405, or at other times. Estimating gravitational acceleration may include corrections for known phenomena, as described above.

Optionally, method 400 includes step 435 which includes modifying gravitational information (e.g., measurements, data, etc.) to compensate for known phenomena. Known phenomena may include time varying events, such as earth tides and terrain, and acute events, such as volcanism and seismic disturbances. Compensating for known phenomena may increase accuracy of the gravity information for the volume of interest.

At least one processor may be used to perform at least steps 440-460. In step 440, a change in frame of reference for the measurements may be estimated based on the prior gravity measurements taken before and after removal of the reference feature. Step 440 may be carried out by estimating the change in frame of reference based on prior gravity measurements (as possibly modified to account for earth tides, terrain, and other effects), or by using gravitational acceleration as estimated using the prior gravity measurements in optional step 430 (as possibly modified to account for earth tides, terrain, and other effects). The change in frame of reference may occur due to the removal and possible subsequent replacement of the reference feature (or a suitable substitute feature). The change in the frame of reference may result from a least one of i) a coordinate translation caused by a change in reference feature position between a first reference feature available in the borehole before removal and a second reference feature available in the borehole after removal; and ii) a coordinate rotation caused by a change in gravity sensor orientation, as described in further detail with reference to vector gravimeters below. Note that the second reference feature may be the first reference feature replaced in the borehole. It is possible that the position change or orientation change may be directly correlated to the change in frame of reference.

Step 440 may include estimating the change in orientation of a reference feature, such as a locking mechanism, for example, using the direction of a gravity vector measured after removal. The axis of rotation may be given by $$n_r = \frac{(g \times g')}{\|(g \times g')\|}, \quad (10)$$

and angle of rotation may be given by one of $$\sin\theta = \frac{(g \times g')}{\|g\|\|g'\|}; \quad (11)$$

$$\cos\theta = \frac{g \cdot g'}{\|g\|\|g'\|}.$$

Given the axis of rotation and the angle, a rotation matrix may be computed that will transform any vector measured after removal into the frame of reference of the measurement before the removal. Each component of the vector can be compensated for the change in location of the measurement point using eqns. 10-11 such that the quantities in the equation now refer to the x, y, and z components of the gravity vector and its gradients along the well bore. Vector gravimeters may be more sensitive to movement of fluid in the formation.

In step 450, at least one gravity measurement may be adjusted using the estimated change. Step 450 may include adjusting the gravity measurement to account for a gravity field gradient associated with the change in frame of reference caused by removal of the reference feature from the borehole. In step 460, at least one formation parameter may be estimated using the at least one adjusted gravity measurement.

In some embodiments, one or more of the steps may be optional. In some embodiments, step 450 may be omitted and fluid movement may be estimated in the borehole. In some embodiments, some or all of the steps may be repeated, or a sequence of steps may be repeated. For example, a sequence of steps 305 to 340 (inclusive) may be repeated to improve sample size without repeating steps 350, 360 and 370.

Figure 5:
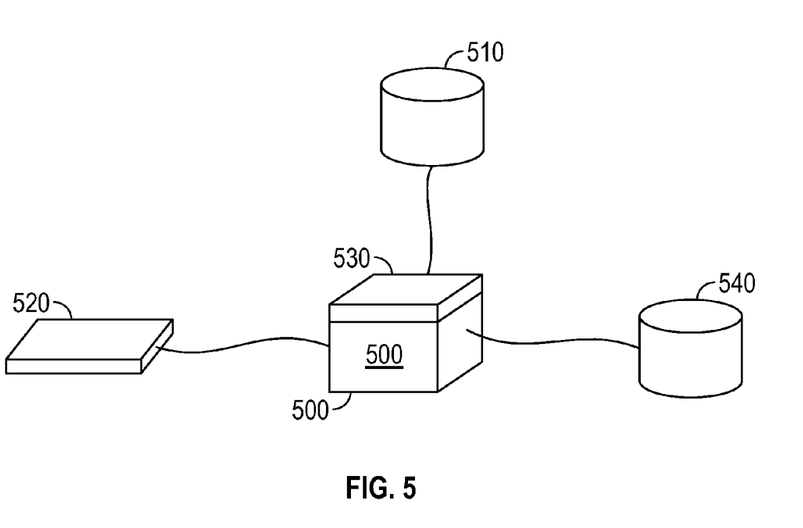
FIG. 5 shows a schematic of an apparatus for implementing one embodiment of the method according to the present disclosure.

As shown in FIG. 5, certain embodiments of the present disclosure may be implemented with a hardware environment that includes an information processor 500, an information storage medium 510, an input device 520, processor memory 530, and may include peripheral information storage medium 540. The hardware environment may be in the well, in the device 100, at the rig, or at a remote location. Moreover, the several components of the hardware environment may be distributed among those locations. The input device 520 may be any information reader or user input device, such as data card reader, keyboard, USB port, etc. The information storage medium 510 stores information provided by sensors on device 100, including one or more gravimeters 110. Information storage medium 510 may be any non-transitory computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 510 stores a program that when executed causes information processor 500 to execute the disclosed method. Information storage medium 510 may also store formation information, or the formation information may be stored in a peripheral information storage medium 540, which may be any standard computer information storage device, such as a USB drive, memory stick, hard disk, removable RAM, network based storage or other commonly used memory storage system known to one of ordinary skill in the art including Internet based storage.

Information processing device 500 may be any form of computer or mathematical processing hardware, including Internet based hardware. When the program is loaded from information storage medium 510 into processor memory 530 (e.g. computer RAM), the program, when executed, causes information processing device 500 to retrieve gravity information from either information storage medium 510 or peripheral information storage medium 540 and process the information to estimate a parameter of interest. Information processor 500 may be located on the surface or downhole.

As used above, an information processing device is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

The term "carrier" as used above means any device, device component, combination of devices, media and/or member that may be used to convey, house, support, or otherwise facilitate the use of another device, device component, combination of devices, media and/or member. Exemplary non-limiting carriers include drill strings of the coiled tube type, of the jointed pipe type, and any combination or portion thereof. Other carrier examples include casing pipes, wirelines, wireline sondes, slickline sondes, drop shots, downhole subs, bottom hole assemblies, drill string inserts, modules, internal housings, and substrate portions thereof.

The well tool 100 may also include sensors, tools, or instruments configured to: (i) actively or passively collect information about the various characteristics of the formation, (ii) provide information about tool orientation and direction of movement, (iii) provide information about the characteristics of the reservoir fluid and/or (iv) evaluate reservoir conditions (e.g., formation pressure, wellbore pressure, temperature, etc.). Exemplary well tools may include resistivity sensors (for determining the formation resistivity, dielectric constant and the presence or absence of hydrocarbons), acoustic sensors (for determining the acoustic porosity of the formation and the bed boundary in the formation), nuclear sensors (for determining the formation density, nuclear porosity and certain rock characteristics), and nuclear magnetic resonance sensors (for determining the porosity and other petrophysical characteristics of the formation). Other exemplary devices may include gyroscopes, magnetometers, and sensors that collect formation fluid samples and determine the properties of the formation fluid, which include physical properties and chemical properties.

In some embodiments, the borehole 12 may be utilized to recover hydrocarbons. In other embodiments, the borehole 12 may be used for geothermal applications, water production, mining, tunnel construction, or other uses.

The term "information" may include, but is not limited to, one or more of: (i) raw data, (ii) processed data, and (iii) signals. A "gravimeter" may be any device configured to estimate acceleration due to the gravitational properties of matter. The at least one gravimeter may include a vector gravimeter. A "vector gravimeter" may be any device configured to estimate the vector components of acceleration due to gravitational properties of matter. A vector gravimeter may be formed using three single axis gravimeters with linearly independent orientations.

The above disclosure discusses a change in frame of reference for measurements taken in relation to the reference feature. The reference frames may be semi-permanent, such that they may be used for gravitational measurements over a long period (e.g., months, years, decades, etc.) and are positioned at the same depth, location, and orientation between relevant gravity measurement periods so as to allow gravity measurements of sufficient precision to measure subterranean fluid movement using time-lapse gravity measurements until an event necessitates change.

Some embodiments include linking the frames of reference by using at least one gravity measurement occurring prior to an event necessitating use of the second reference feature and at least one other gravity measurement occurring after the event, taken in short succession (e.g., shortly before and after removal of the reference feature). These gravity measurements may occur in a time window of a duration such that a gravity field spanning the respective locations of the gravity measurements remains substantially unchanged over the time window. Example time window durations may include two weeks, one week, days, or less.

Some embodiments include adjusting measurements or otherwise reconciling gravity information to account for the difference in frames of reference for these measurements, so that measurements (information) before and after removal would show the same results for unchanged formation conditions. In this way, it is possible to reconcile a number of measurements over many years.

Formation characterization in accordance with embodiments of the disclosure may further include using the adjusted measurements. Some embodiments may include measuring gravity before and after removal at measurement locations and estimating the change in reference feature location from the difference in these measurements and the measured gravity gradient along the borehole. Changes in reference feature location may be translated into a change in frame of reference and used for formation characterization.

More particularly, some embodiments relate to estimating the movement of fluid in an earth formation using gravity measurements from at least one gravimeter deployed within a borehole intersecting the earth formation. The measurements span a period of time including removal of a reference feature used for positioning the gravimeter. For example, production tubing in a production well incorporating the reference feature may be removed. Thus, the gravity measurements may be adjusted to compensate for any resulting changes in the frame of reference for particular measurements.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

We claim:

1. A method of characterizing a parameter relating to at least one fluid in a formation intersected by a borehole, the method comprising:
   taking a first gravity measurement in the borehole using a first gravimeter, the borehole containing a first reference feature;
   after taking the first gravity measurement, removing the first gravimeter and the first reference feature from the borehole;
   after removing the first gravimeter and the first reference feature from the borehole, positioning a second reference feature and a second gravimeter in the borehole;
   taking a second gravity measurement using the second gravimeter;
   estimating a difference in position between a position of the first reference feature during the first gravity measurement and a position of the second reference feature during the second gravity measurement using the first gravity measurement and the second gravity measurement;
   adjusting at least one additional gravimeter measurement in the borehole using to compensate for the estimated difference; and
   using the adjusted at least one additional gravimeter measurement to characterize the parameter.

2. The method of claim 1, wherein the parameter relates to at least one of: (i) a fluid contact, (ii) water migration, (iii) liquid hydrocarbon migration, (iv) gaseous hydrocarbon migration, (v) gas migration, and (vi) fluid saturation.

3. The method of claim 1, further comprising:
   wherein the difference in position between the first reference feature and the second reference feature is estimated using an estimated gravitational field gradient at at least one of the first gravity measurement and the second gravity measurement.

4. The method of claim 3, wherein the estimated gravitational field gradient is obtained using at least one of: i) a plurality of measurements of the first gravimeter; ii) a plurality of measurements of the second gravimeter, iii) a gradiometer, iv) at least one measurement from each of the first gravimeter and the second gravimeter; v) at least one measurement from each of the first gravimeter and a third gravimeter mounted on a tool with the first gravimeter; and vi) at least one measurement from each of the second gravimeter and a fourth gravimeter mounted on a tool with the second gravimeter.

5. The method of claim 1, wherein at least one of the first reference feature and the second reference feature is positioned in the borehole and along a production tubing.

6. The method of claim 1, wherein the second reference feature is different from the first reference feature.

7. The method of claim 1, wherein the second gravimeter is the same as the first gravimeter.

8. The method of claim 1, wherein the second gravimeter is different from the first gravimeter.

9. The method of claim 1, further comprising:
   estimating a difference in orientation between the first gravimeter and the second gravimeter; and
   wherein adjusting the at least one gravimeter measurement comprises using to compensate for the estimated difference in orientation.

10. The method of claim 1, further comprising lowering the first gravimeter into the borehole.

* * * * *

UNITED STATES PATENT AND TRADEMARK OFFICE
CERTIFICATE OF CORRECTION

PATENT NO. : 9,541,672 B2
APPLICATION NO. : 13/720521
DATED : January 10, 2017
INVENTOR(S) : Carl M. Edwards, Daniel T. Georgi and Antonius M. Loermans Page 1 of 1

It is certified that error appears in the above-identified patent and that said Letters Patent is hereby corrected as shown below:

In the Claims

At Column 16, in Claim 1, Line 43, please remove the word "using"

Signed and Sealed this
Seventeenth Day of April, 2018

Andrei Iancu
*Director of the United States Patent and Trademark Office*